United States Patent [19]

Maeda

[11] Patent Number: 4,658,705
[45] Date of Patent: Apr. 21, 1987

[54] CONTROL SYSTEM FOR HYDRAULIC FLUID PRESSURE

[75] Inventor: Fujio Maeda, Komatsu, Japan

[73] Assignee: Kabushiki Kaisha Komatsu Seisakusho, Tokyo, Japan

[21] Appl. No.: 625,015

[22] Filed: Jun. 27, 1984

[30] Foreign Application Priority Data

Jun. 30, 1983 [JP] Japan .................................. 58-116919

[51] Int. Cl.⁴ ............................................ F15B 13/07
[52] U.S. Cl. ...................................... 91/518; 91/531; 137/596.12
[58] Field of Search ........................... 91/518, 531; 137/596.12

[56] References Cited

U.S. PATENT DOCUMENTS

| | | | |
|---|---|---|---|
| 3,467,126 | 9/1969 | Ballard et al. | 137/596.12 |
| 3,478,646 | 11/1969 | Cryder et al. | 91/518 |
| 3,962,954 | 6/1976 | Jacob et al. | 91/518 |
| 4,096,882 | 6/1978 | Yano et al. | 137/596.12 |
| 4,148,248 | 4/1979 | Risk | 137/596.12 |
| 4,317,466 | 3/1982 | Ikeda et al. | 137/596.12 |
| 4,321,855 | 3/1982 | Bacquie et al. | 137/596.12 |
| 4,345,736 | 8/1982 | Zeuner et al. | 137/596.12 |
| 4,535,681 | 8/1985 | Nakamura et al. | 91/531 |

*Primary Examiner*—Willis R. Wolfe, Jr.
*Attorney, Agent, or Firm*—Frost & Jacobs

[57] ABSTRACT

A system for controlling the pressure of hydraulic operating fluid selectively supplied from a pressurized hydraulic fluid source into an actuator or actuators for speed-change clutch-brakes of a multi-stage power shift transmission through hydraulic fluid circuits by the interposition of predetermined directional control valves selected from a plurality of directional control valves connected with the actuators, respectively, has a hydraulic fluid pressure control valve assembly including a pressure modulating valve, a modulating relief valve, and a device for raising a preset relief pressure of the modulating relief valve. The preset relief pressure raising device comprises a balance piston-cylinder assembly actuated by a pressurized pilot fluid supplied from the pressurized hydraulic fluid source.

5 Claims, 4 Drawing Figures

CONTROL SYSTEM FOR HYDRAULIC FLUID PRESSURE

BACKGROUND OF THE INVENTION

1. Field of the invention:

This invention relates to a system for controlling the pressure of hydraulic operating fluid supplied into hydraulic actuators for speed-change clutch-brakes of a multi-stage power shift transmission.

2. Description of the prior art:

The control system of the type specified comprises, in general, a plurality of hydraulic speed-change actuators such as, for example, a plurality of speed-change clutch-brake cylinders; a group of directional control valves adapted to supply hydraulic fluid under pressure selectively into the clutch-brake cylinders; hydraulic fluid circuits for supplying the hydraulic fluid under pressure delivered from a pressurized fluid supply source through the directional control valves into the plurality of speed-change clutch-brake cylinders, and a group of modulating valves adapted to modulate the pressure of hydraulic operating fluid in the hydraulic fluid circuits.

The hydraulic operating fluid for actuating the above-mentioned clutch-brakes is supplied at a predetermined pressure through a hydraulic fluid circuit into the speed-change clutch-brake cylinder or cylinders selected by the operation of the directional control valves, and then increased in hydraulic pressure therein so as to effect the clutch-brake actuating function. Needless to say, it is necessary for safe and reliable speed-change operation that the speed-change operation is made uniformly through the whole speed stages. However, there occurs irregularity of the speed-change operation because of the resistance in the hydraulic fluid circuits or passages, leakage of hydraulic operating fluid and the difference in volume among clutch-brake cylinders, etc. Particularly, in the hydraulic power shift transmission gear including a rotary type clutch-brake speed change mechanism, it takes a longer time to fill up the mechanism with hydraulic operating fluid as compared with that required in the case of controls of speed-change clutch-brake pressure in a planetary gear type speed reduction system. For this reason, a delay of timing will occur between disengagement of the clutch-brake before the speed-change operation and engagement of the clutch-brake selected by the operator. As a result, a period during which the transmission of the power is cut off is prolonged thus causing a speed drop of the vehicle and shock at the time of speed changes.

To solve such problems, there have so far been taken a measure wherein the volume of hydraulic operating fluid to be discharged from the speed-change clutch-brake cylinder is restricted so as to delay the release of the clutch-brake to enable the power transmission condition to be maintained during the period between the disengagement of the speed-change clutch-brake and the commencement of engagement of the clutch-brake selected by the operator, or another measure as disclosed in the Japanese Patent Publication No. SHO 57-16259 wherein engagement and disengagement of the speed-change clutch-brakes are controlled electrically so as to compensate the hydraulic fluid pressure drop which occurs when the clutch-brake is released with the hydraulic fluid pressure rise at the time when the clutch-brake is engaged thereby preventing the possible interruption of power transmission.

The above-mentioned known measures are effective technical approaches. However, the former measure wherein the discharge of the pressurized hydraulic fluid actuating the clutch-brake is restricted is disadvantageous in that it is difficult to define the size of the restrictor and adjust combination of a plurality of speed-change clutch-brakes, and therefore a stable timing of releasing the clutch-brake cannot be obtained. Whilst, the latter measure wherein the clutch-brake release timing is allowed to overlap the timing of engaging the selected clutch-brake to achieve the hydraulic fluid pressure control is disadvantageous in that it is complicated in structure and expensive in construction cost.

SUMMARY OF THE INVENTION

The present invention has been contemplated in view of the above-mentioned circumstances, and has for its aim to provide a hydraulic fluid pressure control system which is simple in construction and which enables the time log required until the system is filled with hydraulic operating fluid to be reduced without having to make difficult adjustments.

Another aim of the present invention is to provide a hydraulic fluid pressure control system wherein, when the pressurized hydraulic fluid is supplied into predetermined speed-change clutch-brake cylinders and/or directional control clutch-brake cylinders, the pressure of the hydraulic operating fluid to be supplied into them can be made higher than the pressure of the hydraulic operating fluid under pressure to be supplied into the other speed-change clutch-brake cylinders and directional control clutch-brake cylinders, and as a result, the volume of the pressurized hydraulic fluid to be supplied into each of the predetermined clutch-brake cylinders can be made more than that of the pressurized hydraulic fluid to be supplied into the other clutch-brake cylinders.

To achieve the above-mentioned aims, according to the first aspect of the present invention, there is provided a hydraulic fluid pressure control system comprising a hydraulic fluid pressure control valve assembly interposed in hydraulic fluid circuits connected between a plurality of hydraulic actuators for clutch-brakes and a pressurized hydraulic fluid supply source and including a pressure modulating valve adapted to modulate or gradually increase the pressure of hydraulic fluid supplied into said hydraulic actuators for clutch-brakes, and a plurality of directional control valves interposed in hydraulic fluid circuits connected between the hydraulic fluid pressure control valve assembly and the hydraulic actuators to supply pressurized hydraulic fluid selectively into desired hydraulic actuators, characterized in that the hydraulic fluid pressure control valve assembly comprises a modulating relief valve provided therein, and means for raising a preset relief pressure of the relief valve.

According to the second aspect of the present invention, there is provided a hydraulic fluid pressure control system as set forth in the first aspect, characterized in that the preset relief pressure raising means comprises a balance piston-cylinder assembly, the balance piston-cylinder assembly comprising a first pressure chamber formed on the bottom side thereof and adapted to receive pressurized pilot fluid supplied through a pressurized pilot fluid supply circuit by a pressurized pilot fluid supply pump which also serves as a hydraulic operating fluid supply pump, a second pressure chamber formed on the piston rod side thereof and connected through a restrictor with the bottom side pressure chamber, a balance piston slidably mounted between the first and second pressure chambers and having a piston rod located in abutting relationship with a valve spool of the pressure modulating valve, and pilot pressurized fluid drain circuits each being connected between the piston rod side pressure chamber and the drain tank through a solenoid operated valve via a one-way valve, the solenoid operated valve connected or associated with a predetermined directional control valve out of said plurality of directional control valves.

According to the third aspect of the present invention, there is provided a hydraulic fluid pressure control system as set forth in the first aspect, characterized in that the preset relief pressure raising means comprises a balance piston-cylinder assembly having a pressure chamber formed on the bottom side and adapted to receive pressurized pilot fluid supplied through a pressurized pilot fluid supply circuit by a pressurized pilot fluid supply pump which also serves as a hydraulic operating fluid supply pump, and a piston having a piston rod located in abutting relationship with the valve spool of said pressure modulating valve and adapted to be slidably moved by pilot fluid pressure; and a balance type directional control valve installed in the pressurized pilot fluid supply circuit and adapted to connect and disconnect the latter, a pilot fluid pressure applying portion on the upstream side of the valve spool of the balance type directional control valve being connected through a restrictor with a downstream pilot pressure applying portion thereof, the downstream pilot pressure applying portion being connected with a drain tank through pressurized pilot fluid drain circuits each including one-way valve means and the solenoid operated valve connected or associated with a predetermined directional control valve out of said plurality of directional control valves.

According to the fourth aspect of the present invention, there is provided a hydraulic fluid pressure control system as set forth in the second or third aspect, characterized in that the predetermined directional control valves which are connected with the pressurized pilot fluid drain circuits, respectively, are connected to hydraulic actuators for clutch-brakes whose volume is larger than that of the other actuators.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

In the first place, a general hydraulic fluid pressure control in an actuator for actuating a clutch-brake will be described with reference to FIG. 1.

Figure 1:
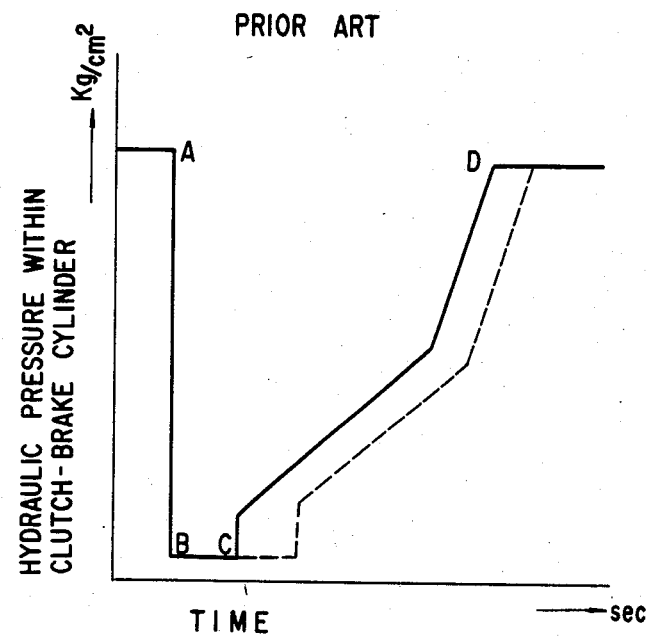
FIG. 1 shows a general fluid pressure control diagram of an actuator for actuating a clutch-brake.

FIG. 1 is a pressure control diagram whose ordinate represents the fluid pressure ($Kg/cm^2$) within the clutch-brake cylinder of the actuator and whose abscissa represents the time (second). In this diagram, the line from A to B indicates a hydraulic fluid pressure drop within the clutch-brake cylinder caused by release of the clutch-brake before speed change; that is, the condition in which a circuit for supplying hydraulic operating fluid from a hydraulic fluid pump and a clutch-brake cylinder connecting circuit are disconnected by means of a directional control valve to allow hydraulic fluid within the clutch-brake cylinder to be discharged. Further, the line from B to C in the diagram shows the time required to fill up the clutch-brake cylinder with hydraulic operating fluid through a connection circuit communicating with a clutch-brake cylinder for speed change selected by the operator; and the line from C to D shows a hydraulic fluid pressure modulation control period during which the hydraulic operating fluid acts as a clutch-brake actuating force after it has filled a predetermined clutch-brake cylinder.

Figure 3:
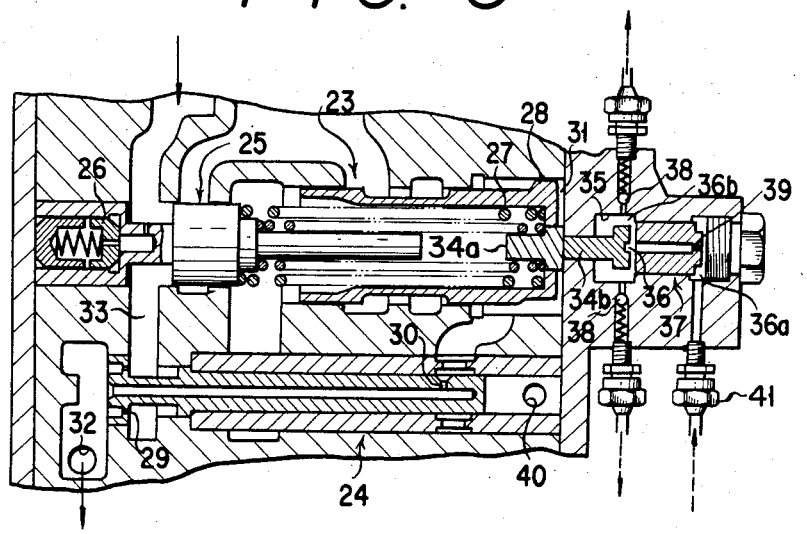
FIG. 3 is a sectional view of one embodiment hydraulic fluid pressure control valve means adapted for use in the hydraulic fluid pressure control system according to the present invention.
Figure 4:
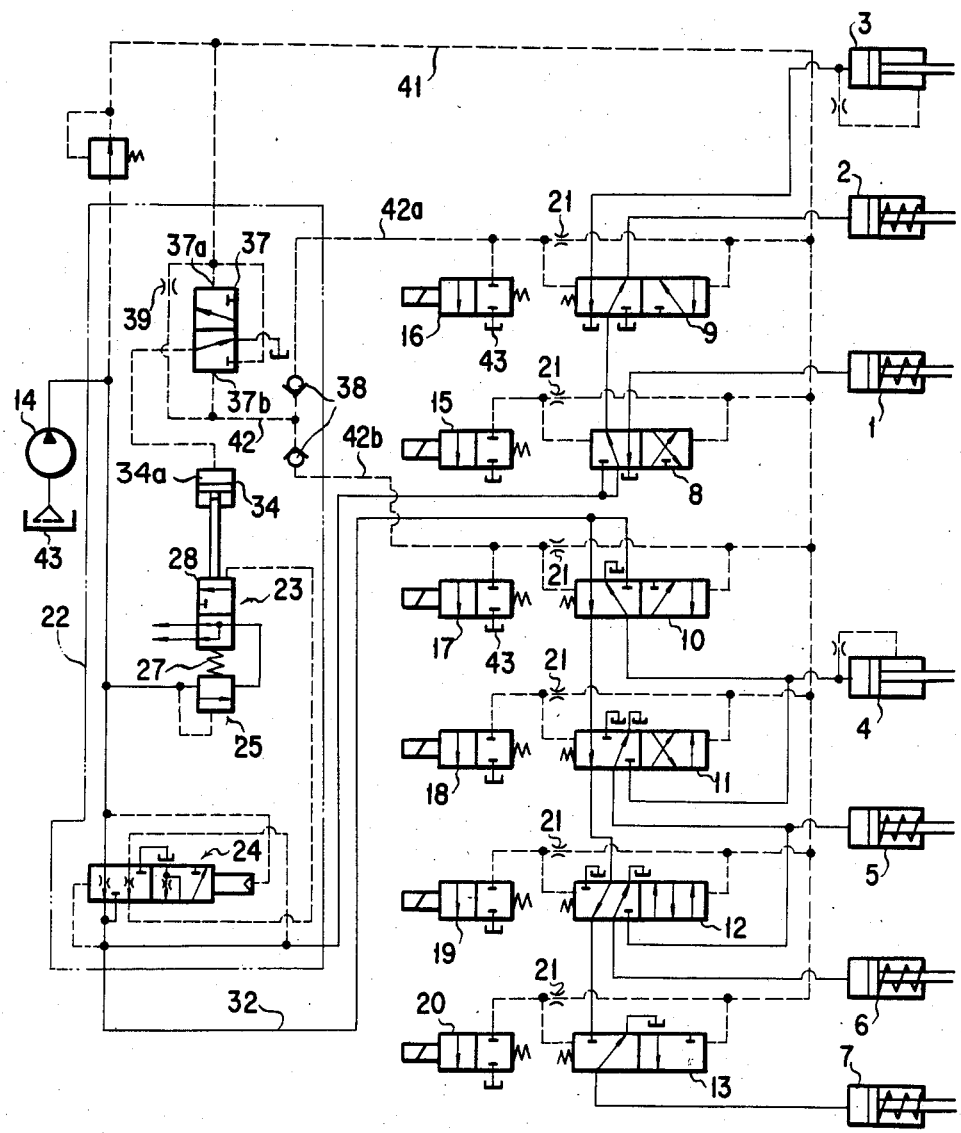
FIG. 4 is a schematic hydraulic circuit diagram showing another embodiment of hydraulic fluid pressure control system according to the present invention.

Embodiments of the present invention will now be described with reference to FIGS. 2, 3 and 4.

Figure 2:
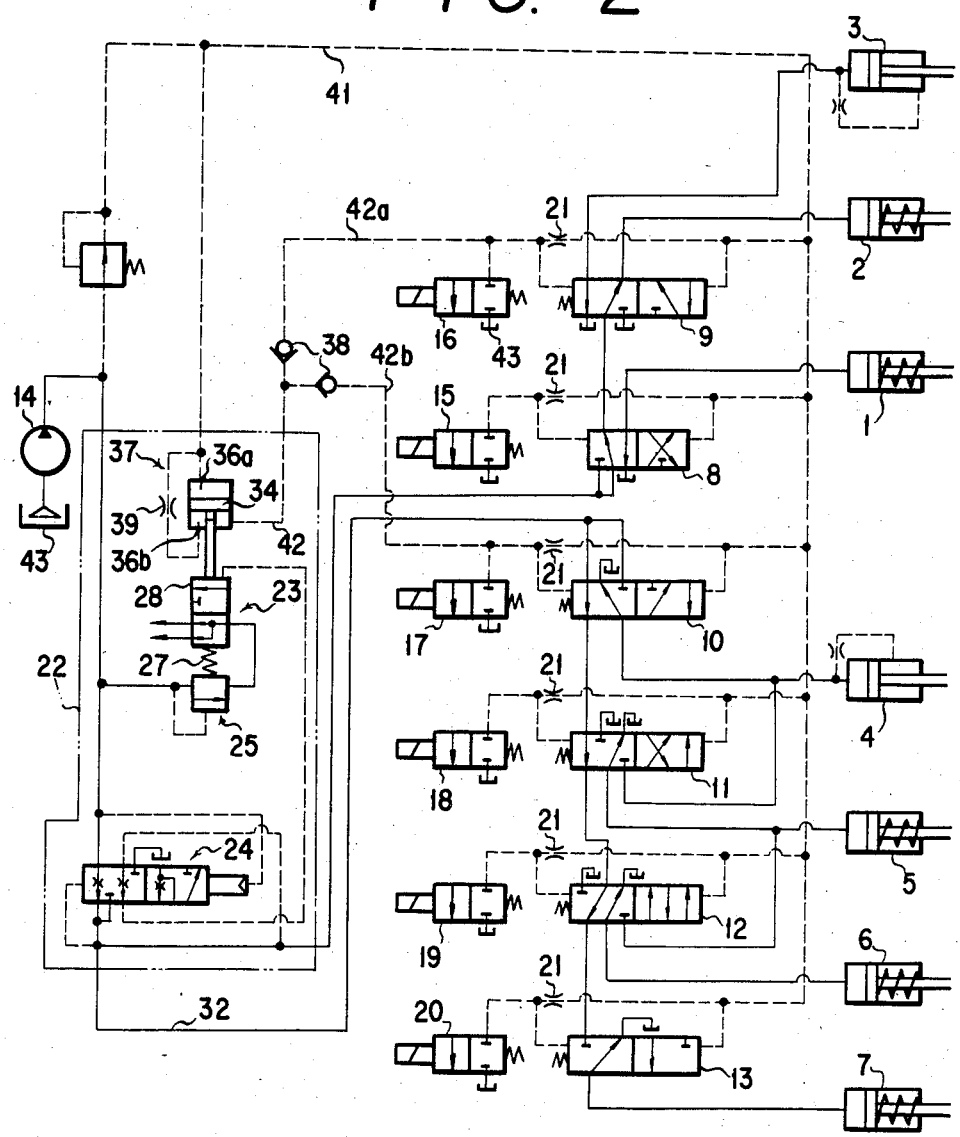
FIG. 2 is a schematic hydraulic circuit diagram showing one embodiment of hydraulic fluid pressure control system according to the present invention.

Referring to FIG. 2, reference numeral 1 denotes a clutch-brake cylinder for low speed, 2 a clutch-brake cylinder for medium speed and 3 a clutch-brake cylinder for high speed, all the clutch-brake cylinders 1, 2 and 3 forming a group of speed-change clutch-brake cylinders. Further, reference numeral 4 denotes a clutch-brake cylinder for third speed stage, 5 a clutch-brake cylinder for second speed stage, and 6 a clutch-brake cylinder for first speed stage, all the clutch-brake cylinders 4, 5 and 6 forming a group of clutch-brake cylinders for speed stages. Further, reference numeral 7 denotes a clutch-brake cylinder for backward running. The arrangement is made such that combination of one of the above-mentioned speed-change clutch-brake cylinder group with one of the clutch-brake cylinder group for speed stages enables the vehicle speed to be changed in the range from the first speed to the eighth speed in forward running, and further, combination of the clutch-brake cylinder 1 for low speed out of the speed-change clutch-brake cylinder group with the clutch-brake cylinder 7 for backward running enables the vehicle to be moved backwards.

Whilst, reference numeral 8 denotes a directional control valve for low speed adapted to supply hydraulic fluid under pressure selectively into the clutch-brake cylinder 1 for low speed, and 9 a directional control valve for medium and high speeds adapted to supply hydraulic fluid under pressure selectively into either of the clutch-brake cylinders 2 and 3 for medium and high speed, respectively, the control valves 8 and 9 being connected in series.

Out of the above-mentioned clutch-brake cylinders 1 to 7, the clutch-brake cylinders 2 and 3 for medium and high speeds, respectively, and the clutch-brake cylinder 4 for the third speed stage have usually a capacity greater than those of the other clutch-brake cylinders.

Reference numeral 10 denotes a directional control valve for third speed stage adapted to supply hydraulic fluid under pressure selectively into the clutch-brake cylinder 4 for third speed stage, and reference numerals 11, 12 and 13 denote directional control valves adapted to supply hydraulic fluid under pressure selectively into the clutch-brake cylinders 5, 6 and 7 for second speed stage, first speed stage and for backward running, respectively. The above-mentioned directional control valves 10, 11, 12 and 13 are connected in series.

Each of the above-mentioned directional control valves 8 to 13 is arranged to be changed over by the differential between pilot fluid pressures acting on both ends thereof. Stating in brief, one side of each of the directional control valves 8 to 13 is connected with the upstream side of a pressurized pilot fluid supply pump 14 which also serves as a hydraulic operating fluid supply pump, whilst the other side thereof is connected through associated one of solenoid operated valves 15 to 20 connected with the directional control valves 8 to 13, respectively, to a drain tank 43. The pressurized pilot fluid applying parts at both ends of each of the directional control valves 8 to 13 are interconnected through a restrictor 21. Further, the arrangement is made such that, when either one of the solenoid operated valves 15 to 20 connected with the directional control valves 8 to 13 is energized to allow the pilot fluid to be discharged into the drain tank 43, the pressurized hydraulic fluid will flow through a pressurized pilot fluid supply circuit 41 and is restricted by means of the restrictor 21 to create a differential between the pilot fluid pressures acting on the opposite ends of the associated directional control valve thus enabling the latter to be changed or switched over.

Reference numeral 22 denotes a hydraulic fluid pressure control valve means, 23 a pressure modulating valve thereof or a valve for increasing hydraulic fluid pressure gradually, and 24 a quick-return valve. The hydraulic fluid pressure control valve assembly 22 is arranged as shown in FIG. 3 and includes a pressure modulating valve 23 which comprises a modulating relief valve 25, a load piston 26 adapted to move slidably the modulating relief valve 25 by the inlet pressure or the hydraulic fluid pressure supplied by the hydraulic fluid pump in the relief direction, and a valve spool 28 adapted to be moved by the inlet pressure against the resilient force of a spring 27. Further, the quick-return valve 24 serves to control hydraulic fluid under pressure applied to a back-pressure chamber 31 of the valve spool 28 of the pressure modulating valve 23 and supply hydraulic fluid under pressure through a restrictor 29 into an output circuit 32. This quick-return valve is arranged to supply hydraulic fluid under pressure through a restrictor 30 into the back-pressure chamber 31 when the pressure in the output fluid circuit 32 is increased and to drain the pressurized hydraulic fluid from the back-pressure chamber 31 when the pressure in the output fluid circuit 32 is reduced. The quick-return valve 24 has an inlet passage 33 connected to the above-mentioned modulating relief valve 25 so that the hydraulic fluid modulated by the modulating relief valve 25 may be supplied thereinto. The above-mentioned output circuit 32 is connected with the directional control valves for the aforementioned clutch-brake cylinders.

The back-pressure chamber 31 of the hydraulic fluid pressure control valve assembly 22 accommodates a first balance piston 34a of pilot pressure balance unit 37, with its leading end abutting against the valve spool 28 of the pressure modulating valve 23. Further, located behind the first balance piston 34a is a second balance piston 34b which can be slidably moved along the inner wall of a balance cylinder 35. The balance cylinder 35 has a first pressure chamber 36a formed on the bottom side thereof which is connected with a pressurized pilot fluid supply circuit 41 so as to urge the second balance piston 34b against the first balance piston 34a. Further, the balance cylinder 35 has a second pressure chamber 36b formed on the piston rod side thereof which is allowed to communicate through the restrictor 39 with the bottom side pressure chamber 36a so that the pressure chambers defined on both sides of the second balance piston 34b are usually kept at the same pressure to thereby maintain the second balance piston 34b in equilibrium.

Referring again to FIG. 2, the hydraulic fluid circuit forming the hydraulic fluid pressure control system according to the present invention will be described below.

One end of a pilot pressurized fluid drain circuit 42 is connected with the piston rod side pressure chamber 36b of the balance cylinder 35. The drain circuit 42 is divided into two branch drain circuits 42a and 42b. The other end of the branch drain circuit 42a is connected with the drain tank 43 through a one-way valve 38 and the solenoid valve 16 connected to the directional control valve 9 associated with the speed-change clutch-brake cylinders 2 and 3 whose volume is larger than that of the other cylinders. Whilst, the other end of the another branch drain circuit 42b is connected, in the similar manner, with the drain tank 43 through a one-way valve 38 and the solenoid operated valve 17 connected with the directional control valve 10 associated with the clutch-brake cylinder 4 for third speed stage whose volume is also greater than that of the other clutch-brake cylinders.

In the above-mentioned arrangement, when either one of the solenoid operated valves 15 to 20 is energized to change-over the directional control valve connected thereto to supply the pressurized hydraulic fluid into one of the speed-change clutch-brake cylinders 1, 2 and 3 and one of the clutch-brake cylinders 4, 5 and 6 for speed stages, one of the vehicle speeds ranging from first speed to eighth speed can be obtained. In this speed-change operation, pressurized hydraulic fluid which flows into a clutch-brake cylinder for a predetermined or selected speed stage is modulated by the hydraulic fluid pressure control valve means 22, and the fluid pressure at that time changes as shown in FIG. 1.

Upon effecting speed-change operation of the hydraulic fluid pressure control system arranged as mentioned hereinabove, when the solenoid operated valves 16 and 17 are switched over into respective drain positions to supply hydraulic fluid under pressure into the speed-change clutch-brake cylinders 2 and 3 and the clutch-brake cylinder 4 for third speed stage, hydraulic fluid under pressure will flow through the pressurized pilot fluid drain circuits 42, 42a and 42b and is restricted by means of the restrictor 39 to cause a difference between the pilot fluid pressures applied to the pressure chambers 36a and 36b defined on both sides of the pilot fluid pressure balance unit 37 thereby allowing the balance piston 34 to urge the valve spool 28 of the pressure modulating valve 23 against the biasing force of the spring 27. As a result, the relief pressure of the modulating relief valve 25 of the hydraulic fluid pressure control valve means 22 is increased, and also the volume of the pressurized hydraulic fluid to be relieved by the control valve means 22 will decrease. Thus, the volume of the pressurized hydraulic fluid to be supplied into the clutch-brake cylinder 2, 3 and 4 will increase and the hydraulic fluid circuits will be filled quickly with hydraulic fluid under pressure. In brief, since the pressure control can be made on the clutch-brake cylinders having a greater volume in the same manner as other clutch-brake cylinders, stable and reliable speed-change operations can be conducted.

In the next place, another embodiment of hydraulic fluid pressure control system according to the present invention will be described with reference to FIG. 4. It is to be noted that to avoid duplication of explanation the component parts identical to those of the first embodiment already described with reference to FIG. 2 are designated with the same reference numerals.

This second embodiment is characterized in that a balance type directional control valve is employed as the pilot pressure balance unit 37.

Stating in brief, the balance type directional control valve 37 has connecting and disconnecting positions and includes pilot fluid pressure applying portions 37a and 37b on both ends thereof. The pilot fluid pressure applying portions 37a and 37b are interconnected through a restrictor 39. The pilot fluid pressure applying portion 37a is connected with a pressurized pilot fluid supply circuit 41, whilst the pilot fluid pressure applying portion 37b is connected to pressurized pilot fluid drain circuits 42a and 42b. Therefore, as in the case of the first embodiment, when the solenoid operated valves 16 and 17 are energized and changed over into respective drain positions, a differential pressure is created between the pilot fluid pressure applying portions 37a and 37b on both sides of the balance type directional control valve 37 so as to enable the latter to occupy its connecting position to allow the pressurized pilot fluid to be supplied into the bottom side pressure chamber 36a of the balance cylinder 35 thereby enabling the balance piston 34 to urge the valve spool 28 of the pressure modulating valve 23 against the resilient force of the spring 27.

Although the aforementioned two embodiments illustrate the cases where the pressurized pilot fluid drain circuits 42a and 42b of the pilot fluid pressure balance unit 37 are connected with the solenoid operated valves 16, 17, respectively, which are connected with the directional control valves adapted to change over the clutch-brake cylinder having a great capacity, it is needless to say that it is possible, as occasion demands, to connect the pilot fluid drain circuits 42a, 42b with the solenoid operated valves which are connected with the directional control valves adapted for changing over other clutch-brake cylinders.

Further, although there is described in the foregoing the case where the directional control valves 16 and 17 are actuated simultaneously, they can be actuated separately.

It is to be understood that the foregoing description is merely illustrative of preferred embodiments of the present invention and that the present invention is not to be limited thereto, but is to be determined by the scope of the appended claims.

What is claimed is:

1. A hydraulic fluid pressure control system, comprising a hydraulic fluid pressure control valve assembly interposed in hydraulic fluid circuits connected between a plurality of hydraulic actuators for clutch-brakes and a pressurized hydraulic fluid supply source and including a pressure modulating valve adapted to modulate or gradually increase the pressure of hydraulic fluid supplied into said hydraulic actuators for clutch-brakes, and a plurality of directional control valves interposed in hydraulic fluid circuits connected between said hydraulic fluid pressure control valve assembly and said hydraulic actuators to supply pressurized hydraulic fluid selectively into desired hydraulic actuators, characterized in that said hydraulic fluid pressure control valve assembly comprises:

(a) a modulating relief valve provided therein; and
(b) means for raising a preset relief pressure of said modulating relief valve.

2. The hydraulic fluid pressure control system as claimed in claim 1, characterized in that said preset relief pressure raising means comprises a balance piston-cylinder assembly, said balance piston-cylinder assembly comprising a first pressure chamber formed on the bottom side thereof and adapted to receive pressurized pilot fluid supplied through a pressurized pilot fluid supply circuit by a pressurized pilot fluid supply pump which also serves as a hydraulic operating fluid supply pump, a second pressure chamber formed on the piston rod side thereof and connected through a restrictor with the bottom side pressure chamber, a balance piston slidably mounted between said first and second pressure chambers and having a piston rod located in abutting relationship with a valve spool of said pressure modulating valve, and pilot pressurized fluid drain circuits each being connected between said piston rod side pressure chamber and a drain tank through a solenoid operated valve via a one-way valve, said solenoid operated valve being connected or associated with a predetermined directional control valve out of said plurality of directional control valves.

3. The hydraulic fluid pressure control system as claimed in claim 1, characterized in that said preset relief pressure raising means comprises a balance piston-cylinder assembly including a pressure chamber formed on the bottom side thereof and adapted to receive pressurized pilot fluid supplied through a pressurized pilot fluid supply circuit by a pressurized pilot fluid supply pump which also serves as a hydraulic operating fluid supply pump, and a piston having a piston rod located in abutting relationship with a valve spool of said pressure modulating valve and adapted to be slidably moved by the pilot fluid pressure; and a balancing type directional control valve installed in said pressurized pilot fluid supply circuit and adapted to connect and disconnect the latter, the pilot fluid pressure applying portion on the upstream side of a valve spool of the balancing type directional control valve being connected through a restrictor with the downstream pilot pressure applying portion thereof, said downstream pilot pressure applying portion being connected with a drain tank through pilot pressurized fluid drain circuits including one-way valve means and a solenoid operated valve connected or associated with a predetermined directional control valve out of said plurality of directional control valves.

4. The hydraulic fluid pressure control system as claimed in claim 2, characterized in that said predetermined directional control valves which are connected with said pressurized pilot fluid drain circuits, respectively, are connected to hydraulic actuators for clutch-brakes whose volume is larger than that of the other actuators.

5. The hydraulic fluid pressure control system as claimed in claim 3, characterized in that said predetermined directional control valves which are connected with said pressurized pilot fluid drain circuits, respectively, are connected to hydraulic actuators for clutch-brakes whose volume is larger than that of the other actuators.

* * * * *